(12) United States Patent
Banin et al.

(10) Patent No.: US 11,175,536 B2
(45) Date of Patent: Nov. 16, 2021

(54) LC-BASED OPTICAL DISPLAY SYSTEM

(71) Applicants: Yissum Research Development Company Of The Hebrew University of Jerusalem Ltd., Jerusalem (IL); QLight Nanotech Ltd., Jerusalem (IL); Merck Patent GmbH, Darmstadt (DE)

(72) Inventors: Uri Banin, Mevasseret Zion (IL); Hagai Arbell, Jerusalem (IL); Bernhard Rieger, Muenster (DE); Ming-Chou Wu, Zhongli (TW)

(73) Assignees: Yissum Research Development Company Of The Hebrew University of Jerusalem Ltd., Jerusalem (IL); Merck Patent GmbH, Darmstadt (DE)

(*) Notice: Subject to any disclaimer, the term of this patent is extended or adjusted under 35 U.S.C. 154(b) by 0 days.

(21) Appl. No.: 15/512,944

(22) PCT Filed: Sep. 20, 2015

(86) PCT No.: PCT/IL2015/050949
§ 371 (c)(1),
(2) Date: Mar. 21, 2017

(87) PCT Pub. No.: WO2016/046815
PCT Pub. Date: Mar. 31, 2016

(65) Prior Publication Data
US 2017/0307939 A1 Oct. 26, 2017

Related U.S. Application Data

(60) Provisional application No. 62/053,299, filed on Sep. 22, 2014.

(51) Int. Cl.
*G02F 1/13357* (2006.01)
*G02B 5/20* (2006.01)
(Continued)

(52) U.S. Cl.
CPC ....... *G02F 1/133617* (2013.01); *G02B 5/208* (2013.01); *G02F 1/137* (2013.01);
(Continued)

(58) Field of Classification Search
CPC ... G02F 1/133617; G02F 2001/133614; G02F 1/133509; G02F 1/133723; G02F 1/13378;
(Continued)

(56) References Cited

U.S. PATENT DOCUMENTS 6,133,975 A   10/2000   Li et al.
7,532,291 B2  5/2009    Kubo et al.
(Continued)

FOREIGN PATENT DOCUMENTS

CN   1351277 A   5/2002
CN   1553254 A   12/2004
(Continued)

OTHER PUBLICATIONS

International Search Report dated Feb. 17, 2016 issued in corresponding PCT/IL2015/050949 application (7 pages).
(Continued)

*Primary Examiner* — Nathanael R Briggs
*Assistant Examiner* — William D Peterson
(74) *Attorney, Agent, or Firm* — Millen White Zelano & Branigan, PC; Brion P. Heaney (57) ABSTRACT

An optically active structure and a display device are presented. The device utilized an optically active structure comprising liquid crystal material and a plurality of nanorods configured to emit light in one or more predetermined ranges in response to pumping light. Variation in orientation of the liquid crystal varies orientation of the nanorods and modulated light emission therefrom.

41 Claims, 6 Drawing Sheets

(51) Int. Cl.
*G02F 1/1335* (2006.01)
*G02F 1/1337* (2006.01)
*G02F 1/137* (2006.01)

(52) U.S. Cl.
CPC .... *G02F 1/13378* (2013.01); *G02F 1/133509* (2013.01); *G02F 1/133723* (2013.01); *G02F 1/13712* (2021.01); *G02F 1/133614* (2021.01); *G02F 1/133742* (2021.01); *G02F 2202/36* (2013.01); *G02F 2203/01* (2013.01); *G02F 2203/34* (2013.01)

(58) Field of Classification Search
CPC ................ G02F 1/137; G02F 1/13712; G02F 1/133614; G02F 1/133742; G02F 2202/36; G02F 2203/01; G02F 2203/34; G02B 5/208
USPC .......................................................... 349/129
See application file for complete search history.

(56) References Cited

U.S. PATENT DOCUMENTS

| | | | |
|---|---|---|---|
| 7,576,478 | B2 | 8/2009 | Hikmet |
| 8,471,969 | B2* | 6/2013 | Banin ............... B82Y 20/00 349/17 |
| 9,475,988 | B2 | 10/2016 | Song et al. |
| 2005/0218377 | A1 | 10/2005 | Lawandy |
| 2005/0270462 | A1 | 12/2005 | Koma |
| 2006/0262111 | A1* | 11/2006 | Kerofsky ............ G09G 3/3406 345/211 |
| 2011/0094585 | A1 | 4/2011 | Debije et al. |
| 2013/0077038 | A1* | 3/2013 | Rho ................. B82Y 20/00 349/144 |
| 2015/0277190 | A1 | 10/2015 | Zhong et al. |

FOREIGN PATENT DOCUMENTS

| | | |
|---|---|---|
| CN | 1955820 A | 5/2007 |
| CN | 101216627 A | 7/2008 |
| CN | 1700076 B | 5/2014 |
| CN | 103941458 A | 7/2014 |
| JP | 10260407 A | 9/1998 |
| JP | 2007532968 A | 11/2007 |
| JP | 2012518808 A | 8/2012 |
| JP | 2013144739 A | 7/2013 |
| TW | 201037390 A | 10/2010 |
| TW | 201432033 A | 8/2014 |
| WO | 2012/053415 A1 | 4/2012 |
| WO | 14114013 A1 | 7/2014 |

OTHER PUBLICATIONS

Written Opinion of the International Searching Authority dated Feb. 17, 2016 issued in corresponding PCT/IL2015/050949 application (10 pages).
V.V. Danilov et al., "Liquid-Crystal Composites with Controlled Photoluminescence of CdSe/ZnS Semiconductor Quantum Rods", Optics and Spectroscopy, vol. 110, No. 6 (2011) pp. 897-902.
M.V. Mukhina et al., "Eletrically Controlled Polarized Photoluminescence of CdSe/ZnS Nanorods Embedded in a Liquid Crystal Template", Nanotechnology, vol. 23, No. 32 (2012) p. 325201.
K.J. Wu et al., "CdS Nanorods Imbedded in Liquid Crystal Cells for Smart Optoelectronic Devices", Nano Letters, vol. 7, No. 7 (2007) pp. 1908-1913.
Translation of Office Action in corresponding Japanese Patent Application No. 2017-535161 dated Jun. 18, 2019 (pp. 1-5).
Search Report in EP application No. 15782078 dated Nov. 7, 2019 (pp. 1-2).
Appeal Proceedings in JP application 2017535161 dated Aug. 21, 2020 (1 page) (English).
Office Action in corresponding CN CN 201580051017 dated Aug. 11, 2020 (pp. 1-11) (English).

* cited by examiner

LC-BASED OPTICAL DISPLAY SYSTEM

TECHNOLOGICAL FIELD

The present invention is generally in the field of optical display systems and more specifically in the field of flat panel display systems.

BACKGROUND

Flat panel display systems are widely used in various devices/systems, such as computer monitors, laptop computers, mobile phones, television sets etc. Generally, flat panel displays became the main display type in the market.

Liquid Crystal (LC) based display systems take a major part in the variety of flat screen display systems. The LC based display systems utilize molecular materials combining certain liquid properties together with crystal-like order between the molecules. The presence of liquid properties allows varying orientation of the LC material in response to external field, e.g. electric field. Different orientations of the LC molecules are typically distinguishable by having different optical properties such as birefringence and/or transmission or rotation of polarized light.

Generally, LC-based display systems utilize corresponding back-illumination units providing high intensity and mostly uniform lighting across the surface of the device. The LC panel of the display system provides modulation to the uniform back-illumination by completely or partially blocking light arriving from different regions along the surface. To provide sufficient modulation, the light illuminated by the back-illumination unit is converted to polarized light (e.g. by an input polarizer that is attached to the bottom part of the LC cell) while phase variation (e.g. rotation) of the LC material varies its transmission to the polarized light.

Various types of LC based displays are known in the art, including devices based on LC materials with negative dielectric anisotropy such as those described in U.S. Pat. Nos. 5,384,065 and 5,599,480.

Additionally, various types of back illumination units are known, including units utilizing optical emission of nanoparticles, e.g. nano-dots and rod-shaped nanoparticles. Such optical display device and illumination units are described for example in U.S. Pat. No. 8,471,969, and US patent publications 2013/181,234 and 2014/009,902, all assigned to the assignee of the present application. Such nanoparticles based lighting units are capable of providing high intensity illumination with a desired color temperature, while reducing energy costs, and in some cases, eliminating or at least reducing the need for polarization filtering.

Further, several display device configurations provide certain transparency to light arriving from back side of the display system. Some known technologies providing at least partially transparent display include: translucent holographic projection systems; Transparent Organic LED (TOLED) display; Reflective head-up display (HUD); Blue reflective thick sheet based display; and Transparent LCD. These techniques provide display to user while allowing transmission of light through the display to enable user view of back side scene of the display system.

For example US 2014/0292839 provides a transparent display device including a liquid crystal panel. The liquid crystal panel includes a color filter substrate, an array substrate, a liquid crystal layer, a first polarizer and a second polarizer. The first polarizer is disposed on a side of the color filter substrate far from the liquid crystal layer. The second polarizer is disposed on a side of the array substrate far from the liquid crystal layer. The color filter substrate includes a transparent base, and a color filter formed on the transparent base. The color filter includes compound pixel regions, wherein each of the compound pixel regions has color sub-pixel regions and a transparent sub-pixel region. The second polarizer includes a non-polarized pattern spatially corresponding to the transparent sub-pixel region in the color filter, after a light passing through the non-polarized pattern, the polarization state remains unchanged.

General Description

As indicated above, LC-based display devices typically utilize the variation of optical transmission to provide modulated illumination (i.e. display an image). More specifically, the image shown on a display device is generated by blocking, or partially blocking, light transmission through different regions/pixels of the device. Such transmission blocking based display techniques require high intensity back illumination causing them to fall behind in energy efficiency.

Additionally, the conventional configuration of transparent or partially transparent display systems suffers from various limitations such as limited viewing angles, low contrast and brightness, and difficulty in scaling up in display size. The technique of the present invention utilizes optically active nanoparticles, and in particular nanorods and optical emission therefrom to provide transparent display system capable of providing desirably high brightness while maintaining transparency of the system (e.g. transmission of 15% or more, preferably 30% and more preferably 40% or more, of visible light passing through the display. There is thus a need in the art for a novel configuration of the display device. The present invention provides an optically active layer/structure configured for use in display devices. The optically active structure is capable of allowing the display device to perform with increased energetic efficiency. Additionally, the use of the optically active structure of the invention enables design of optically transparent display systems. The optically active structure of the invention comprises one or more layers having a plurality of optically active rod-shaped nanoparticles embedded within a liquid crystal (LC) molecular matrix. The rod-shaped nanoparticles are preferably aligned with the LC material such that orientation variation of the LC molecules causes rotation/shifting of the nanoparticles together with the LC molecules.

The optically active rod-shaped nanoparticles are selected to absorb light of a predetermined first wavelength range typically corresponding to a range between blue light and UV, and typically including UVA range (320-400 nm) range and/or violet wavelength range (380-450 nm), and emit in response light of one or more second wavelength ranges (generally within the visible spectrum). It should be noted that the wavelengths of the second wavelength range are determined in accordance with size, geometrical shape and material composition of the nanoparticles. Similarly, absorption of light of the first wavelength range is typically determined in accordance with material composition of the nanoparticles. According to some preferred embodiments, the nanoparticles are selected to be anisotropic nanoparticles, i.e. having one axis longer than the others. Additionally, according to some of the preferred embodiments, the nanoparticles are selected to be rod-shaped semiconductor nanoparticles. Such rod-shaped nanoparticles (also referred to as nanorods) may have core-shell, core-double shell or core-multi-shell structure, where the core is formed of a first material composition and the one or more shells are formed of one or more other material compositions. Additionally, the core itself may be a single material core, a core-shell or core-multi-shell and may be of anisotropic geometry or not.

Rod-shaped nanoparticles (nanorods) generally show dipole-like optical emission in response to optical or electric pumping energy. Additionally, nanorods typically provide optical emission with relatively high polarization ratio (PR) of the emitted light. To this end polarization ratio is generally defined as a ratio between emitted intensity of light having parallel polarization and perpendicular polarization with respect to axis of alignment of the nanorods. More specifically, upon appropriate pumping the nanorods emit light of a predetermined wavelength range, determined in accordance of nanorods' parameters, and the emitted light propagates substantially in directions perpendicular to the long axis of the nanorods. Additionally, light emitted by the nanorods is substantially linearly polarized, i.e. may have a polarization ratio (PR), defined as the ratio measured between intensity of nanorods' emissions of parallel and perpendicular polarization with respect to the nanorods long alignment axis, higher than 1.5, or preferably higher than 4. Thus, rotation of the nanorods varies the direction of propagation of light emitted therefrom, and may also vary the polarization and polarization orientation of the emitted light.

To this end, the LC layer, in which the nanorods are embedded, is configured to vary the orientation of the LC molecules in response to external field. Generally, the LC layer is configured for responding to external electric field, being direct current (DC) or alternating current (AC) field, by varying orientation of the LC molecules. In some embodiments, the LC molecules are configured to be aligned parallel to the surface of the layer in one orientation (planar orientation) and aligned vertical to the surface of the layer in a second orientation (vertical/homeotropic orientation). Additionally, rotation of the LC material is preferably configured to also vary orientation of the nanorods embedded therein. This rotation of the nanorods may affect at least one of absorption of the pumping energy by the nanorods and one or more properties of light emitted from the nanorods as will be described in more details further below.

Thus, as described above, according to some embodiments, the present invention provides a display system carrying the optically active structure being configured and operable to response to input pumping energy (e.g. pumping light) and provide, in accordance with operational commands from a control unit, structured light emitted from the device. In some embodiments, the display system is configured to be at least partially transparent to visible light. The display device is typically configured to vary light emitted therefrom to generate one or more output images having predetermined times of presentation (e.g. a video display).

Thus, according to one broad aspect the present invention provides an optically active structure comprising at least one layer comprising liquid crystal material and a plurality of optically active nanorods mixed together within said at least one layer, wherein in one orientation of the liquid crystal material, the nanorods respond to input radiation of a first pumping wavelength range by emitting light of one or more predetermined second wavelength ranges at a first intensity level and in another orientation of the liquid crystal material the emission from the nanorods is reduced to a second intensity level.

The optically active nanorods may be selected as having material composition and geometry to emit light of said at least one second wavelength range.

The liquid crystal material is preferably configured to vary orientation thereof in response to external electric field. Further, variation in orientation of the liquid crystal material preferably cause rotation of axis of alignment of said optically active nanorods accordingly, thereby varying properties of light absorbed by and emitted from the optically active nanorods. The variation in orientation of the liquid crystal material may provide a continuous variation of emission of light from the nanorods.

Generally, the liquid crystal material in the optically active nanorods may be aligned along a predetermined axis parallel to surface of the structure in one orientation state and vary orientation thereof to be aligned along a predetermined axis perpendicular to the surface of the structure in another orientation state. In some embodiments, the liquid crystal material may be configured with negative dielectric anisotropy.

The nanorod material may be selected or configured to vary its emission properties in response to external electric field; the applied electric field may cause quenching of the nanorod emission of light reducing intensity of light emission in the presence of electric fields. It should be noted however, that the nanorods' material is preferably selected such that presence of external electric field substantially does not significantly vary wavelength of emission, this is to avoid color variation when emission intensity is reduced.

The optically active structure may further comprise an electrode arrangement comprising a plurality of electrode elements defining a plurality of separately operable pixels of the structure, said electrode elements of the electrode arrangement are configured to selectively apply electric field to corresponding pixels to thereby cause rotation of the liquid crystal material and optically active nanorods.

The optically active structure may comprise optically active nanorods of two or more type, wherein each type comprises optically active nanorods having material composition and dimensions selected to provide optical emission in selected wavelength range different from wavelength range of nanorods of other types. The optically active nanorods of different type may being arrange is a plurality of pixel regions of the structure thereby enabling color image formation by selective spatial and temporal variation of emitted light (e.g. red green and blue pixel regions) and/or pixel regions emitting white light of desired illumination temperature.

In some embodiments, the optically active structure, liquid crystal and optically active nanorods thereof may be configured to be optically partially transparent to light of the visible spectrum. The optically active nanorods may be configured to emit light of visible spectrum in response to pumping light in a first wavelength range comprising ultraviolet (UV) or violet illumination.

In some embodiments, the liquid crystal material may comprise nematic liquid crystal material. In some embodiment, the optically active structure may further comprise at least one alignment layer located in physical contact with said liquid crystal material, said at least one alignment layer is configured to align the liquid crystal material in rest state thereof. The at least one alignment layer may comprise polymer stabilized vertical alignment layer.

The optically active structure may further comprise one or more domain separators located is physical contact with the liquid crystal material and nanorods material at one or two sides of the structure to thereby provide multi-domain alignment of the liquid crystal material and the corresponding nanorods.

Typically, it should be noted that the optically active structure may be configured for use in a display device.

According to one other broad aspect, the present invention provides a display device configured to selectively display a desired pattern (an image), the device comprising:

a pumping light source configured to provide optical illumination of a first pumping wavelength range, an optically active structure comprising aligned nanorods and LC material, the nanorods are configured to emit light of one or more selected second wavelength ranges in response to the pumping light, and an electrode arrangement configured to provide an external field to thereby locally vary the orientation of the LC material and the nanorods, to thereby modulate light emission from the nanorods; generally variation in the orientation of the LC is configured to induce a corresponding variation in the orientation of the nanorods thus selectively modulating light emission from desired pixel regions of the display device.

The display device may be configured to be at least partially transparent to light of the visible wavelength range, or of a portion of the visible spectrum.

The display device may be configured to be dynamically controlled to provide for displaying non-static images such as movies. To this end the display device may comprise, or be associated with, a control unit configured and operable to generate image data corresponding to one or more images, and to operate the electrode arrangement of the optically active structure to vary orientation of the LC material in selected pixel regions to ON and/or OFF modes, as well as intermediate levels in-between the OFF and ON mode, to thereby form the desired images.

The display device may further comprise a blocking/diffusing layer located between the device and light arriving from back-scene thereof, the blocking/diffusing layer/element is configured to selectively block or diffuse light of a predetermined wavelength range arriving from back-scene of the device, for example, to block light of the wavelength of the pumping light such as UV pumping light minimizing the fluorescence of the active layer when used or a part of all of the visible part of the spectrum (400-700 nm) thus dimming back illumination of the scene behind the display and/or providing a non-transparent display mode.

According to yet another broad aspect of the invention, there is provided a display system comprising an optically active structure configured to generate patterned illumination generating desired image, the optically active structure comprising at least one layer comprising optically active nanorods configured to emit output light of a predetermine wavelength range in response to pumping energy, and liquid crystal material. The display system may be configured to be at least partially transparent to visible light. The at least one layer may comprise a mixture of said optically active nanorods and said liquid crystal material such that variation in orientation of the liquid crystal material causes corresponding variation in orientation of said optically active nanorods.

In some embodiments, the optically active nanorods may be configured to be responsive to pumping energy being optical pumping of a first predetermined wavelength range, to thereby emit light of one or more second wavelength ranges. The first wavelength range may comprise at least one of the following: violet light and ultra violet light wavelengths, said one or more second wavelength ranges may comprise visible light.

The display device may comprise an electrode arrangement associated with the optically active structure thereof and configured to selectively apply electric field onto said liquid crystal material to cause variation in orientation thereof. The electrode arrangement may comprise plurality of electrode elements defining a plurality of separately operated pixel regions of said optically active structure.

In some embodiments, the optically active nanorods may comprise nanorods of two or more types, each type is selected in accordance with dimension and structure and composition of the nanorods to emit light of predetermined different wavelength range. The nanorods of two or more types may comprise at least three types of nanorods, each type is selected to emit light of a predetermined wavelength range corresponding with a primary color.

The display device may further comprise a pumping light source configured to provide pumping energy in the form of optical pumping of a first wavelength range to thereby cause said optically active nanorods to emit light of one or more second wavelength ranges. The pumping light source may be configured to be located at a predetermined distance from said optically active structure, said predetermined distance being higher than 1 centimeter, or higher than 5 centimeter. In some configurations the pumping light source may be located at a distance greater than 50 cm, or greater than 1 meter, from the optically active structure of the display device.

According to some embodiments, the display device may further comprise at least one filter layer configured to filter out light of undesired wavelength ranges. The filter layer may be configured to block transmission of the pumping light (e.g. ultra violet) illumination and allow transmission of background and/or emitted light (e.g. the visible spectrum).

The liquid crystal material and said optically active nanorods of the optically active structure may be mixed together such that variation in orientation of said liquid crystal material in certain region of the structure caused variation of rotation of said optically active in said region, thereby increasing or reducing optical emission from said nanorods in response to pumping energy.

According to some embodiments, variation of orientation of the liquid crystal material and the corresponding nanorods may provide an OFF state where the nanorods are aligned with long axis thereof being parallel to general direction of output light propagation, and ON state where the nanorods are aligned with long axis thereof being parallel to a surface of said at least one layer and emit light in response to pumping energy. The display device may be further configured for providing one or more intermediate states associated with orientation of the liquid crystal material thereby enabling one or more intermediate levels of optical emission from one or more pixel regions.

According to some embodiments the display system may further comprise a blocking/diffusing layer located between the device and light arriving from back-scene thereof, the blocking/diffusing element is configured to selectively block or diffuse light of a predetermined wavelength range arriving from back-scene of the device, thus providing "smart glass" capabilities of the display device.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The present invention provides a display based on fluorescence anisotropic nanomaterial inserted into or embedded in a liquid crystal layer. The anisotropic nanomaterial may preferably be configured to provide optical illumination with increased color quality while mixing of anisotropic nanomaterial in the liquid crystal provides for a simplified structure and modulation of emission therefrom.

Figure 1A:
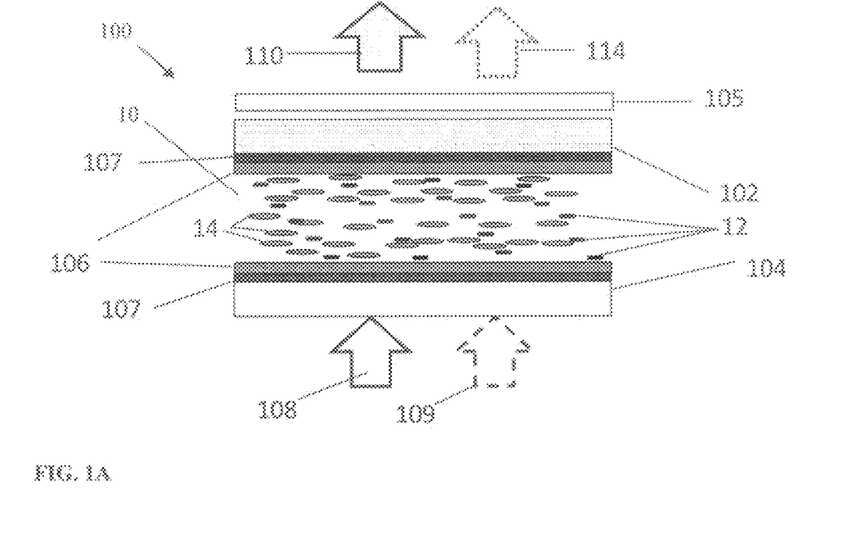
FIGS. 1A and 1B illustrate schematically a portion of a display device utilizing an optically active layer including an LC layer with embedded nanorods according to some embodiments of the present invention in ON and OFF states respectively.
Figure 1B:
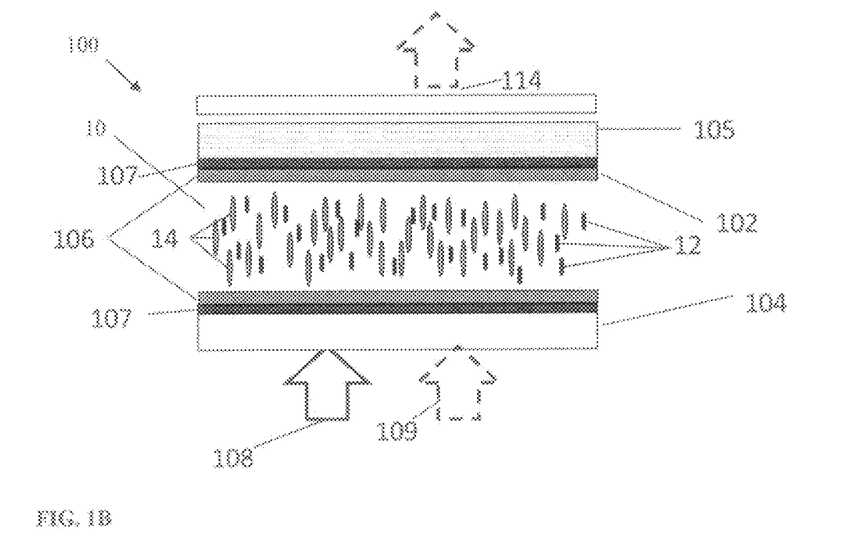

Reference is made to FIGS. 1A and 1B illustrating schematically a cross section of a portion of a display device (e.g. a pixel cell) 100 utilizing an optically active structure (layer) 10 according to the present invention, shown in ON (FIG. 1A) and OFF (FIG. 1B) states. The optically active structure 10 includes a mixture of liquid crystal (LC) molecules 14 and anisotropic nanomaterial particles 12 (nanorods) aligned together along a preferred axis and configured to vary orientation in response to applied external field. The active layer 10 of the display device 100 may generally be enclosed between top 104 and bottom 102 substrates, which are preferably transparent to light of the visible spectrum, and possibly also to ultra violet illumination, specifically, the top and bottom substrates may be transparent to pumping light of the first wavelength range and emitted light of the second wavelength ranges. Additionally, the device may include one or more alignment/orientation layer 106, e.g. formed by a layer of rubbed polyimide, two such layers are shown in the figures. The device may also include, or be associated with an electrode arrangement 107 configured to selectively provide an electric field modulation promoting variation in orientation of the LC material 14. Generally, variation in orientation of the LC material 14 induces variation in orientation of the nanomaterial particles 12 and thus provides modulation of the optical activity of the device 100. In some configurations, the electrode arrangement 107 includes transparent electrodes, e.g. ITO (indium-tin oxide) based electrodes, to allow transmission of optical radiation therethrough. The nanorods 12 of the optically active layer 10 are selected and configured to response to input pumping light 108 of a first wavelength range (e.g. blue, violet, UV or any suitable wavelength based on the nanorods' material composition and desired device applications) by emitting light of one or more second wavelength ranges 110. The display device 100 may include a pumping light blocker 105 configured to block unabsorbed components of the pumping light to prevent interference in the displayed image. It should be noted that FIGS. 1A and 1B as well as all the following figures are schematic and do not relate to actual sizes of different elements. More specifically, relative size of the LC material with respect to that of the nanorods is generally out of scale and cannot be learned from the figures. Nanorods material generally suitable for use according to the present invention may be of length (long axis) of 8-500 nm, or preferably between 10 to 160 nm and have width, or diameter, of a few nanometers (e.g. 3 nm to 50 nm) and having an aspect ratio, being the ratio between the length along the long axis and the length along the short axes, higher than 1.5, and preferably higher than 3. The LC molecules 14 are configured to rotate in response to external electric field and rotate back when said electric field is null. FIGS. 1A and 1B illustrate an example of the ON/OFF states of the display device 100. In FIG. 1A the LC material 14 is in its resting orientation, and aligned along an axis parallel to surface of the structure 10. This configuration causes the nanorods 12 to be aligned together with the LC molecules along a similar axis parallel to the surface of the structure 10. At this orientation, the nanorods 12 are aligned with their long axis perpendicular to the direction of input pumping light 108 and perpendicular to the desired direction of propagation of output emitted light 110. This provides efficient absorption of the pumping light by the nanorods 12, and emission of light of the one or more second wavelength ranges with significant portion thereof propagation in the desired direction to project an image by the device. Thus output emitted light 110 of the second wavelength range being emitted from the nanorods may propagate in the desired direction from the display device and towards the viewers as shown in FIG. 1A.

When an appropriate electric field is applied between electrodes of the electrode arrangement 107, the molecules 14 of the LC material rotate accordingly and cause corresponding rotation of the nanorods 12 embedded in the layer 10. In this example, as shown in FIG. 1B, the nanorods 12 are oriented in the OFF state such that the long axis thereof is perpendicular to the surface of the layer 10. In this configuration, light emitted from the nanorods propagates substantially within the layer 10 and substantially does not propagate out of the layer. Additionally, the cross section for absorption of pumping light 108 in back-illumination is greatly reduced as a result of the nanorods' 12 orientation as well as a result of the quenching effect on the nanorods fluorescence caused by the external electric field applied by the electrodes 107. Thus, appropriate variation of the orientation of the LC material and the nanorods in a selected region (pixel) provides for local modulation of the optical emission by the nanorods and enables turning a region of the optically active layer between ON and OFF states including intermediate states.

Generally, the nanocrystals 12 of this invention are semiconductor elongated structures such as seeded nanorods, nanorods or core/shell nanorods. The nanorods are inserted into a suitable Liquid Crystal material 14 with or without additional surface modification processes, such as attachment of surface ligands etc. The nanorods may be aligned within the LC layer by the LC molecules orientation. The LC molecules may be aligned by any suitable technique such as utilizing rubbed Polyimide layer or by photo alignment. Application of electric field to selected electrodes of the display device induce local (e.g. within a pixel region) rotation to the LC material together with the nanorods such that long axis thereof is parallel or substantially parallel to the electric field (e.g. with angular tolerance of ±10 degrees). This switches a selected corresponding region of the display between ON, OFF and intermediate states. It should be noted that although in FIGS. 1A and 1B the ON state is described when no electric field is applied and the OFF state is described as being caused by application of electric field, this is selected by the configuration of different embodiments as described herein below. The "ON state" term refers to a state with strong emission of light to the viewer and the "OFF state" term refers to a state with no emission or weak emission of light in direction of the viewer. It should also be noted that orientation of the nanorods with the long axis being aligned vertically to the surface of the layer is shown in FIG. 1B provides several effects that synergistically reduce and minimize output light from the optically active layer.

First, the electric field applied on the nanorods, having a direction parallel to the long axis of the nanorods provides quenching of optical activity of the nanorods. The quenching results by electron-hole separation under the electric field and is described in details in U.S. Pat. No. 8,471,969 describing quenching by any of DC and AC electric fields applied in the same direction of the nanorods long axis. As described, electric field applied on the nanorods results in significant quenching of the emitted light. It should however be noted that the material and configuration of the nanorods is preferably selected such as to eliminate, or at least significantly reduce shifts in wavelength of emission as a result of external electric field. This is to avoid color variation resulting from image forming by the display device.

Second, as indicated above, optical emission from nanorods has substantially dipole-like distribution. More specifically, most of the light is emitted in a direction normal to the long axis of the nanorods and only very little light is emitted in the direction of the long axis. By aligning the nanorods with the long axis thereof directed at the viewer, only very small portion of emitted light propagates towards the viewer. Thus most of the intensity of the emitted light will be directed to the sides where appropriate absorbers may be placed to prevent leakage of light.

Third, absorption of pumping light by the nanorods depends on a corresponding cross section for absorption. In the so-called "off configuration" shown in FIG. 1B, the nanorods are oriented such that the long axis thereof is parallel to the direction of propagation of pumping light. This minimizes the cross section for absorption of pumping light and thus reduces emission from the nanorods.

It should be noted that in some embodiments of the invention, orientation variation of the LC material may also be used for rotation of polarization of light emitted by the nanorods. The device may typically include a polarization filter located downstream of the optically active structure 10 with respect to general direction of light propagation. Thus, when a region of the device is in ON state, the LC material allows light emitted by the nanorods to propagate without polarization rotation and be transmitted by the additional polarization filter, and in the OFF state, the LC may assist in rotating polarization of at least a portion of the emitted light to thereby cause this portion to be filtered out by the additional polarization filter.

Thus, variation of orientation of the nanorods, by applying an electric field on the LC material, provides for eliminating, or at least significantly reducing optical emission of the nanorods in response to pumping light. However, in some configurations where optical emission of the nanorods is not eliminated completely, the orientation variation results in directing the emitted light to be absorbed in suitable light absorbers located between pixel regions to at least significantly reduce the emission in the outward direction (to the viewers). This is while in the ON-state of the pixel element of the device, generally there is no effect preventing optical emission from the nanorods and the absorption cross section is much larger compared to the OFF state, resulting is high optical emission in response to pumping light. Thus, in the ON-state, the nanorods are oriented parallel to the plane of the optically active structure 10, providing high cross-section for absorption of input pumping light to thereby cause optical emission therefrom. The nanorods thus absorb strongly, emit their maximum emission and the directionality of the emission is directed towards the output direction of the display. In this state the orientation of the nanorods is such that light emitted in directions of adjacent pixels is configured to be minimal and light intensity in the viewing direction may be at a maximum. Additionally, a suitable back-reflector, which may typically be configured to transmit the pumping light while reflecting light emitted from the nanorods, may be used to direct greater portions of light in the preferred direction.

In this connection it should also be noted that application of intermediate voltages provides intermediate light intensity output (commonly referred to as grayscale capability). More specifically, intermediate field amplitude causes rotation of the LC and nanorods to orientation that is between in plane and perpendicular with respect to the optically active layer 10, thereby resulting in emission of reduced light intensity and especially light propagation in the desired direction towards the viewer. This allows for generation of "gray-scale" pattern using one type of nanorods providing a monochrome image. Additionally, in a display utilizing a plurality of pixel elements, variation of the intensity of light output from certain pixels may be used to improve image quality. In such "multi-pixel" display system, different pixel regions include nanorods of different optical emission properties, i.e. nanorods emitting Red light in one pixel and those emitting Green light in a neighboring pixel region. This configuration provides the device with capability to present colored images.

Additionally, and differently from the conventional LC-based display systems, the technique of the present invention does not require the use of any polarization filter for modulation of optical emission and generation of images on the display. However, as indicated above, in some embodiments the use of such polarization filter may be beneficial. The modulation of light output from the nanorods is generally achieved by varying orientation of the nanorods reducing emission therefrom, and thus light filtering is not specifically required. This omission of the polarization filter may provide to better energy efficiency and lower costs with better colors.

Also, the technique of the present invention allows for configuring a completely transparent display device, i.e. a see-through display device. This can be achieved by utilizing an optically transparent electrode arrangement (e.g. ITO electrodes) and optically transparent carrying substrates. In this configuration, the pumping light may preferably be of UV wavelength range arriving from the back of the display and/or from sides thereof. This is while light of visible spectrum arriving from objects located behind the display device is transmitted through the device. This is exemplified in FIGS. 1A and 1B, showing background scene ("additional") light input 109 and output 114 in addition to pumping light 108 and emitted light 110.

As indicated above, the optically active structure 10 and display device according to the present invention utilizes two main materials groups to provide the desired optical activity and modulation thereof. The optically active structure 10 generally includes:

1. Liquid Crystals material (LC)
2. Anisotropic fluorescent semiconductor nanostructures (nanorods)

It should however be noted that additional component such as ligands and additives may be used in the optically active layer, to enable and/or simplify insertion of the nanostructures into the liquid crystal.

Various types of liquid crystal materials and mixtures can be used in combinations with the nanorods. These materials are preferably capable of aligning in a homogenous (also known as planar) alignment. The LC material may preferably be nematic LC material, however other types of LC material may be used. The nematic LC material may have a dielectric negative or positive anisotropy. Alignment of the LC is typically induced by an external electrical field and/or by the boundary conditions of the substrate surface that is in contact with the LC material of the optically active layer. For example, a polyimide coating of the substrate that is optionally rubbed can align the LC molecules parallel to the substrate surface. Other combinations and phases of LC materials can also be used.

Suitable LC materials are generally known in the art. The material properties may be chosen according to the preferred mode of alignment and switching of the optically active structure. In a preferred mode a dielectric negative LC material may be selected. It is preferably used in a configuration with a vertical alignment of the LC material in relation to the substrate to thereby enable optimizing the above described modulation of light emission from the nanorods.

Optically active anisotropic nanoparticles (nanorods) that are useful in various embodiments of the invention may be in general made of semiconductor materials, for example II-VI, III-V, or IV-VI semiconductors as well as various combinations thereof. Such materials are also described in more detail in the above-indicated patent publications including U.S. Pat. No. 8,471,969 and patent publications US 2014/009,902 and US 2013/115,455 assigned to the assignees of the present application. A semiconductor material may be selected from CdS, CdSe, CdTe, ZnS, ZnSe, ZnTe, ZnO, GaAs, GaP, GaAs, GaSb, HgS, HgSe, HgTe, InAs, InP, InSb, AlAs, AlP, AlSb, $Cu_2S$, $Cu_2Se$, $CuInS_2$, $CuInSe_2$, $Cu2(ZnSn)S_4$, $Cu_2(InGa)S_4$, $TiO_2$ alloys thereof, and various mixtures thereof. This list of materials may refer to either the rod material (in the case of nanorods), to the core and shell materials (in core/shell nanorods), or to the seed and rod materials in seeded rod structures. Seeded nanorods may have a seed (or core) located asymmetrically within an elongated shell. The core may be typically located at about one fourth to one half of the length on the elongated particle, but other locations may also be possible. Typical sizes for a seed may be between 1 to 20 nm and more particularly between 2 to 10 nm in diameter. In addition to a first shell, further shell layers may be included for stability and optical function. The material combination and dimensions of the nanorods are typically tuned to provide tuning of optical emission is desired colors as required for the application.

The length of the overall nanorod structures may exemplarily range between 8 nm to 500 nm and better between 10 to 160 nm. The overall diameter of a rod may exemplarily be between 1-20 nm, and more particularly between 1-10 nm. A typical nanorod has an aspect ratio length/diameter of above 1.5, or preferentially above 3. Through control of size and compositions, the emission color of the anisotropic nanorods can be tuned for different samples to provide the required base colors of a display. For example, a single type of rod sample can be used for a monochromatic backlight source for a monochrome display, or a combination of two or more different rods emitting at different colors can be used for a color display. As indicated above, variation in dimension, structure, and material/chemical composition (e.g. aspect ratio, geometric shape, different composition of core and/or various shells of the nanorods etc.) of the nanorods are generally used to control wavelength of emission thereof. For example, diameter variations of the seed and rod are used to control wavelength of emission.

The nanorods are configured such that each type of nanorods emit light having a relatively narrow bandwidth, and with a wavelength range in the visible spectrum. Generally, the nanorods are selected to emit light of visible colors commonly used in the display industry (e.g. Red, Green and Blue) however additional colors or combination of colors may be used to enhance image quality. Typically nanorods may be selected to emit light with Full Width Half Maximum (FWHM) below 60 nm to thereby provide high quality colors, and in some cases below with FWHM of 45 nm or below.

The nanorods may be covered/surrounded by molecular ligands capable of enhancing the optical properties of the nanorods and in some configurations, to assist in providing common rotation of the nanorods with the LC material. The molecular ligands may also increase dispersion of the nanorods and LC within the layer, providing higher and uniform distribution of the nanorods within the optically active layer. Ligand coverage of the nanorods can be obtained at the synthesis stage of the nanorods or can be exchanged after the nanorods are synthesized. Various ligands are used to transfer the nanorods into aqueous or organic solutions.

Thus, to provide a pixel structure of the display device, the optically active layer is configured with a plurality of pixel regions, each containing LC and nanorods selected to emit light of one or more wavelength ranges (typically each pixel is configured to emit light of one color). Specifically, the optically active layer may be located in between two (preferably transparent) substrates, and include an electrode arrangement including plurality of preferably transparent electrodes arranged along the structure (across a surface thereof), e.g. on both or one of the substrates, to selectively apply suitable electric field to different pixel regions. The different electrodes of the electrode arrangement are configured to generate localized electric fields onto the optically active structure and thereby define and operate pixel regions of the layer. In some configurations, at least one substrate is coated by an orientation layer, e.g. polyimide material, or any other material configured to by rubbing or provide alignment of the LC material to a specific direction with respect to the plane of the substrate. As described above, the LC material is preferably configured to be aligned in parallel to the surface of the optically active layer. However, as will be described further below, additional orientations of the LC material may be used.

Referring back to FIGS. 1A and 1B, it should be noted that the optically active structure may preferably be configured to allow transmission of visible light through the device 100, while absorbing input pumping light (e.g. UV light) resulting in emission of output light by the nanorods in the ON and intermediate states. It should be noted that in this connection the structure may be optically transparent to ambient light of the visible spectrum in the meaning that at least 15%, and preferably 40% or more, of light arriving from one side of the structure may be transmitted therethrough. Typically the use of liquid crystal material in the optically active structure of the invention causes rotation in polarization of light passing therethrough, in this connection as portion of light passing through the structure may be reflected or absorbed in accordance with polarization states thereof. It should further be understood that the optically active structure and a display device utilizing the structure may or may not utilize one or more polarizer filters for enhancing display quality. Such polarizer filters may reduce optical transmission of ambient light through the device.

Additionally, the exact profile of response of the optically active structure to applied field with or without pumping energy (e.g. pumping light) actually depends on plurality of design parameters of the structure. These parameters include measure of the LC-nanorod alignment response, response of the nanorod to electric field (e.g. quenching emission due to external electric field), mechanical properties of the optically active nanorods, concentration of the nanorods in the LC layer and the frequency and waveform of the applied field affecting the LC and the nanorods.

Figure 2A:
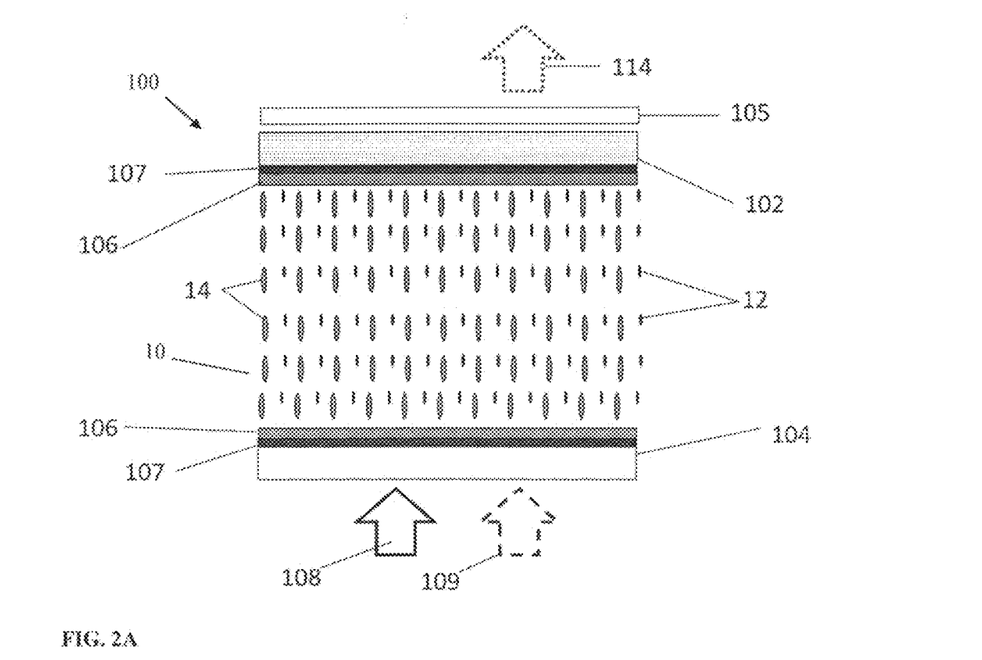
FIGS. 2A and 2B illustrate a portion of a display device utilizing a vertically aligned LC layer with embedded nanorods according to some embodiment of the present invention in OFF and ON states respectively.
Figure 2B:
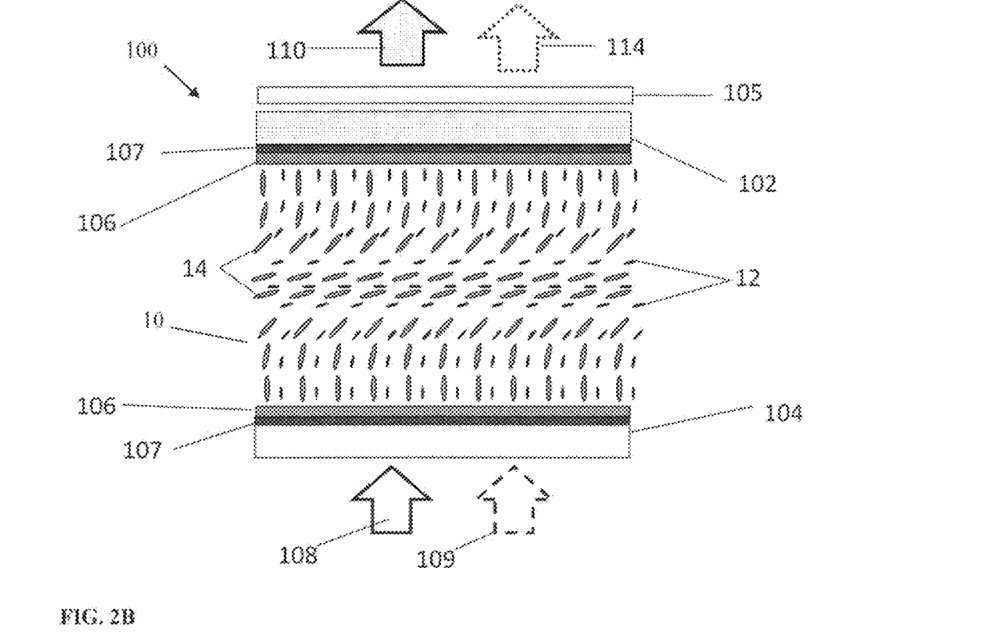

As indicated above, according to some embodiment of the present invention, the LC and nanorods layer may be configured to be in ON state with zero electric field and to be turned OFF upon application of electric field. This configuration may be provided utilizing nematic liquid crystals. In some other embodiments, the "on state" may be obtained upon application of electric field while the "off" state is the rest state of the device, obtained with no application of electric field. This may be provided using homeotropic liquid crystal material, as commonly used in various vertical alignment (VA) type liquid crystal based devices. Reference is made to FIGS. 2A and 2B illustrating OFF (FIG. 2A) and ON (FIG. 2B) states of the display device according to some embodiments of the invention. FIG. 2A shows homeotropic LC 14 with embedded nanorods 12. When electric field is provided by electrodes 107, a layer of the LC material rotates to be in plane with the optically active layer thereby rotating the corresponding nanorods and allowing emitted light to be directed out of the layer. As shown in the figure, the layer/region of the LC material 14 may be configured to vary orientation thereof along the entire region of the layer 10 or such that a portion of the LC material 14 rotates while a portion is left in rest state. This provides rotation of the optically active nanorods 12 to enable optical emission 110 therefrom in response to pumping light 108.

Figure 3A:
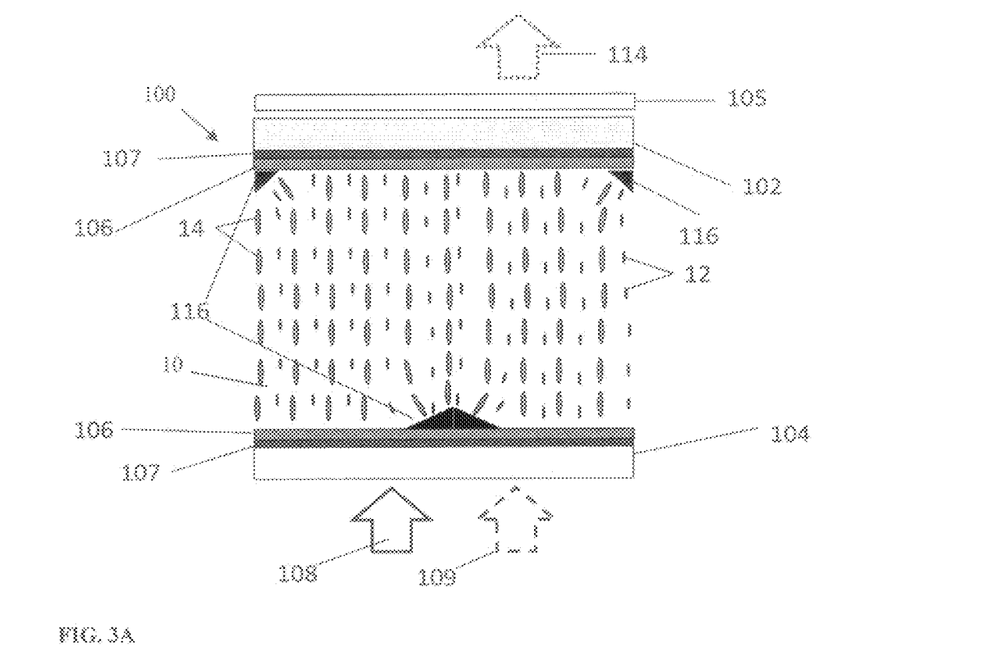
FIGS. 3A and 3B illustrate a portion of a display device utilizing a vertically aligned LC layer in a multi-domain pixel cell with embedded nanorods according to some embodiment of the present invention in OFF and ON states respectively.
Figure 3B:
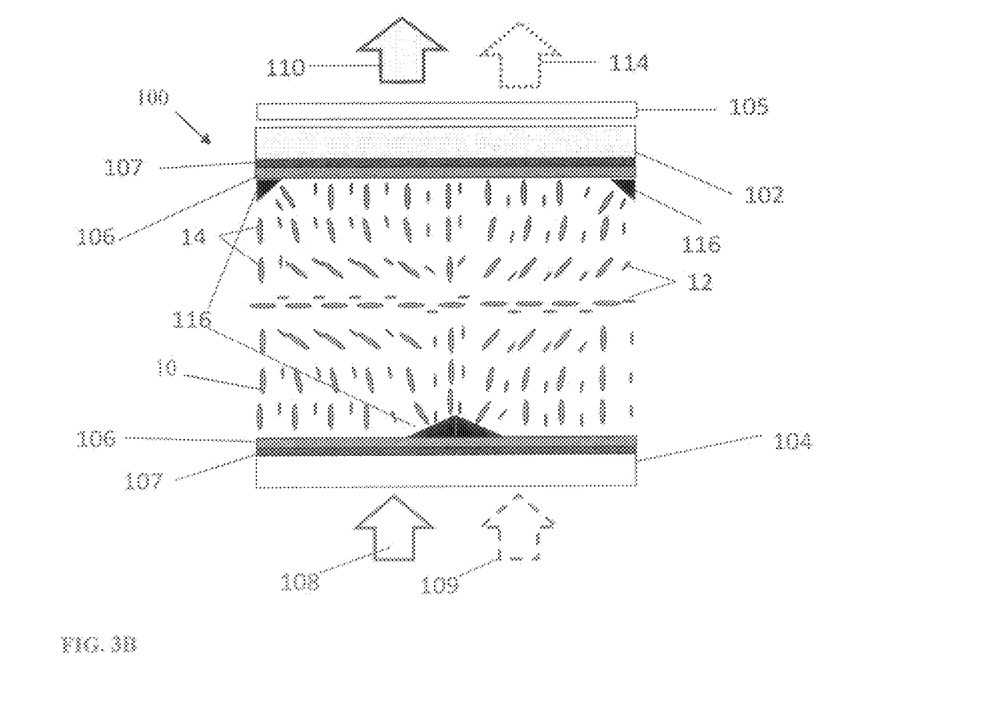

FIGS. 3A and 3B illustrate multi-domain vertical alignment (MVA) configuration of the optically active layer. This configuration includes domain separating elements 116 extending from the substrate to vary alignment of the LC. Generally, FIG. 3A shows OFF stated with no electric field applied and FIG. 3B shows the ON states when electric field is applied on the region. Separating features (e.g. protrusions) 116 are located on one or two sides of the LC/nanorods mixture region to produce multi-domain alignment of the liquid crystal material 14 within region of the structure defining a single pixel.

Figure 4A:
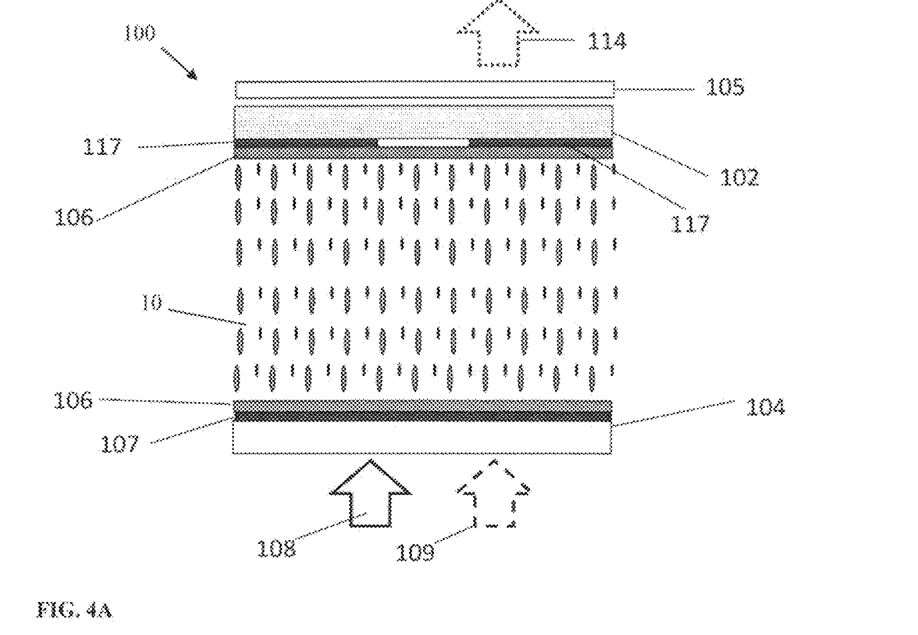
FIGS. 4A and 4B illustrate a portion of a display device utilizing a vertically aligned LC layer in a patterned electrode pixel cell with embedded nanorods according to some embodiment of the present invention in OFF and ON states respectively.
Figure 4B:
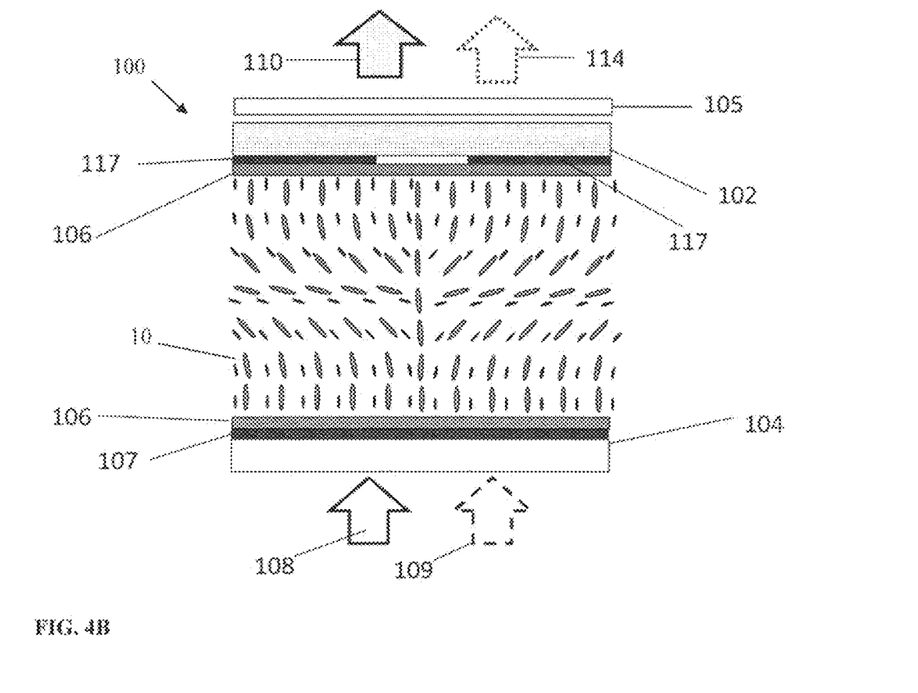

FIGS. 4A and 4B illustrate an additional configuration utilizing patterned vertical alignment (PVA) layer. In this configuration two separated electrodes 117 are located in vicinity of a pixel region and configured to apply voltage of equal magnitude on the top substrate part. FIG. 4A shows OFF stated with no electric field applied and FIG. 4B shows the ON states when electric field is applied on the region.

Such configuration of the optically active structure 100 enables the use of electrode arrangement including patterned electrodes 117 that are located within a single pixel and/or on a single side of the structure 100. Additionally or alternatively, one or more of the electrode elements may be patterned to provide selective access to specific pixel region. This is while the other electrode element may or may be not patterned.

It should be noted that the electrode arrangement may include an arrangement of a plurality of electrode elements 117 configured to selectively and desirably apply electric field to different pixel regions of the structure 100, and thus of the display system utilizing the optical active structure to form desired images. It should further be noted that according to some embodiments of the invention the electrode arrangement may include an arrangement of a plurality of electrode elements associated with different pixel regions from one side of the optically active structure, while a single electrode element providing ground contact of the other side of the optically active structure. In some other embodiments, both sides of the optically active structure may utilize a plurality of pixel dedicated electrode elements. Also, in some embodiments utilizing multi-domain vertical alignment (MVA) configuration of the optically active structure (the liquid crystal material) a single pixel may be associated with a plurality of electrode elements varying electric field applied onto one or more of the different domains of the pixel region.

Some additional configurations of the liquid crystal material and control of its orientation, e.g. utilizing polymer stabilized vertical alignment (PS-VA) layer, may be used. The orientation of the LC material containing the nanorods may be stabilized and optimized by addition of polymerizable additives (e.g. reactive mesogens) layer in the active layer (e.g. in contact with the liquid crystal material). The switching performance can be improved thereby and alignment protrusions as shown in FIG. 3A (element 116) may be omitted.

In some of the VA based devices the ON state may include nanorods that are not directed vertically but are in the horizontal direction and thus are not necessarily homogenously aligned. For example in the MVA (FIGS. 3A and 3B) and PVA (FIGS. 4A and 4B) type structures, different regions of the pixel may include nanorods and liquid crystal molecules that are aligned at different angles with respect to the horizontal projection on the substrate plane. In addition the VA based devices may have additional electrode patterning features and aligning features that are different from those shown in FIGS. 1A and 1B.

The above described optically active structure 100 may be used, according to some embodiments of the invention, as patterned light emitting structure in a display device. To this end the display device may typically include the optically active structure, and an electrode arrangement configured to selectively apply electric field to desired pixel regions of the structure. Thus enables turning selected pixels between ON and OFF states to thereby generate an image visible to a viewer. Typically, the optically active structure may also be configured such that adjacent pixel regions include nanorods emitting light of different three or more wavelength ranges (colors). Typically, such different colors include primary colors, e.g. red, green and blue; to thereby provide full colored images by mixing. In some configurations the optically active structure may include pixel regions of four or more different colors, to thereby enable enhancement of image quality.

Figure 5A:
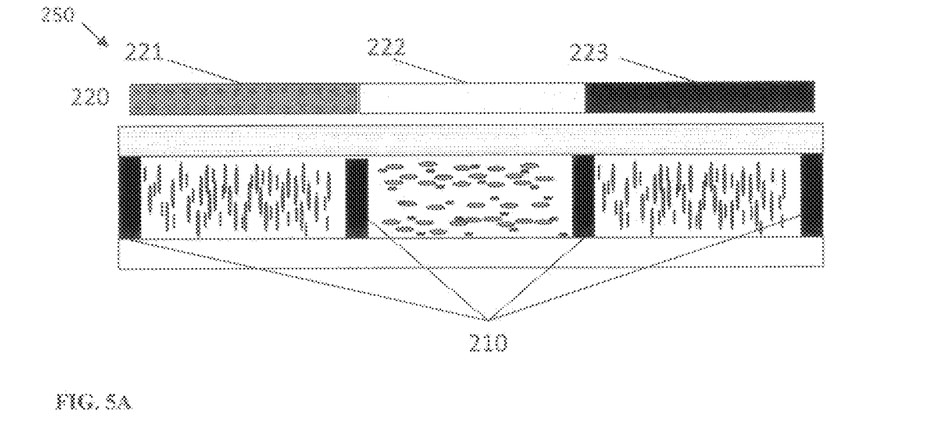
FIGS. 5A and 5B schematically illustrate side (FIG. 5A) and top (FIG. 5B) views of three adjacent pixels of the display device.
Figure 5B:
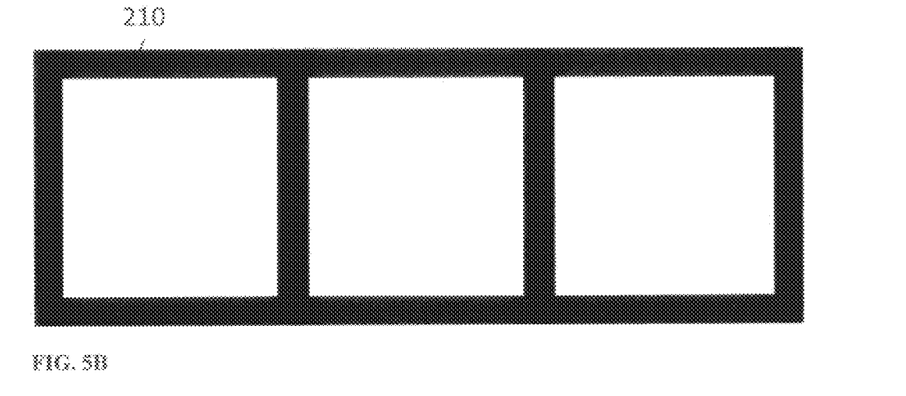

In this connection reference is made to FIGS. 5A and 5B schematically illustrating an exemplary portion of a display system 250 of the invention, the display system portion 250 includes three pixels out of a two dimensional array of pixels of a display device as described above. The electronic connections and control structures described above are not specifically shown to simplify the illustration. The pixel array 220 is formed by placing nanorods material of selected (different) emission properties within selected different pixel regions. Generally it should be noted that pixel regions may be defined by effecting region of electrode elements, i.e. by the electrode arrangement. However, in some configurations different adjacent pixel regions may be physically separated between them to prevent mixing of the LC and nanorods between pixels. In the example shown in FIGS. 5A and 5B each pixel or each row/column of pixels is configured with materials from a different nanorods group and is separated from the pixels of adjacent regions by separators 210. The separators 210 may be configured to separate material of adjacent pixels regions and may also provide blocking or absorbing of light that is emitted from the corresponding pixel and its adjacent pixels to prevent leakage of light between pixel regions. To this end, the material composition of the separating regions 210 may preferably be selected as having high absorbance and low reflectance for light of the visible spectrum range, or at least of the wavelength ranges of emission of the corresponding nanorods. For example, the separators 210 may be configured of resin with absorbing pigments or other suitable materials.

Additionally, as also exemplified in FIGS. 5A and 5B, the display system 250 may utilize an additional color filter layer 220, having an array of filter cells of different colors 221, 222, 223. The array of filter cells is typically aligned with the pixel arrangement such the each filter cell corresponds to a pixel region. And the pixel regions and filter cells are paired based on color of emission of the pixel regions. The color filter 220 is configured to assist in reducing light leakage from adjacent pixel regions and/or leakage of ambient light.

It should be noted that some embodiments of the invention, the display system 250 may be configured while nor requiring the use of separators 210 between adjacent pixels. To this end, a mixture of selected nanorods emitting at different selected wavelength ranges may be mixed together within one or more pixel regions, to thereby produce a combined emission of two or more colors, typically red, green and blue. Thus generally providing white light illumination. Operation of the electrode arrangement to vary emission from different pixel regions affects emission of nanorods of the different colors, and generally controls intensity of emitted light from the corresponding pixel region. To provide color display, i.e. having different pixels emitting in different colors, the display system 250 may thus utilize color filter array as exemplified by color filters cells 221, 222, 223 to filter emission of the different pixel regions and cause different pixels to emit light of different colors. This configuration may provide less energy efficient display, however may not require the use of border region structure (separators 210) and this reduce manufacturing complexity.

It should be noted that the display system 250 according to the present invention is not exemplified with, neither requires the use of, any polarization filters to modulate light emission. This is contrary to most liquid crystal based display relying of polarization rotation property of the liquid crystal material. Additionally, the conventional LC based display systems, and most conventional display systems, are based on blocking of transmission of light. This is while the display system of the invention is based on modulation of light emission by nanorods within different pixel regions. The emission of the display device of the present invention is obtained optical excitation of light emitting nanorods and causing fluorescence therefrom. Additionally modulation of the emitted light to generate image on the display device is provided by modulation of absorption and emission properties of the nanorods. In part, the modulation effect is based on directionality of dipole emitters (i.e. the nanorods), on generating an electrical field inducing quenching of nanorods' emission and reducing absorption of pumping light and variations of this effects for different orientation of the nanorods. Thus, the display system of the invention may be configured to provide higher light transmission (transparence of the display system). The transmission of ambient light through the display system is generally dependent on concentration of the nanorods as well as on filling factor of the pixel array and on the absorption of the nanorods in the visible range.

It should however be noted that one or more polarizer filters may still be used in the display system 250, which are not specifically shown here. Generally one or more of the polarizer filters may be located above the top substrate, i.e. directing the viewers, to provide additional contrast between ON and OFF states. The polarization filter may utilize the intrinsic polarized emission of the nanorods and the fact that in the OFF orientation thereof, any small emission intensity includes light components of different polarizations. The terms "contrast" or "contrast ratio" used in the context of the display system 250 according to the invention do not refer to the commonly used term that measuring the ratio between a white pixel and a black pixel in a regular LCD device. These terms as used herein define a measure of the ratio between fluorescence emission from a pixel region in the ON state and in the OFF state, thus the contrast ratio actually relates to the level of transparency of the display.

As indicated above, in the ON state the nanorods are aligned within the optically active structure, i.e. parallel to surface of the structure/layer and thus the emitted light therefrom is substantially polarized along the nanorods' direction of alignment. This is while in the OFF state, the nanorod are aligned "Standing" on their tips, i.e. aligned parallel to general direction of light propagation towards the viewers, perpendicular to surface of the display system, and therefore emit light with no preferred alignment or polarization. Thus, the use of a polarizer filter may almost double achieve contrast ratio, since a polarizer blocks about 50% of the unpolarized light emitted in the OFF state and transmit most of the polarized light emitted in the ON state. It should however be noted that light emission in the OFF state is configured to be substantially negligible. It should be further noted that this effect is mostly relevant in display devices utilizing relatively homogeneous liquid crystal alignment within pixel region. This is while typically multi domain type configuration of pixel regions may not benefit the use of polarizer filters.

Figure 6:
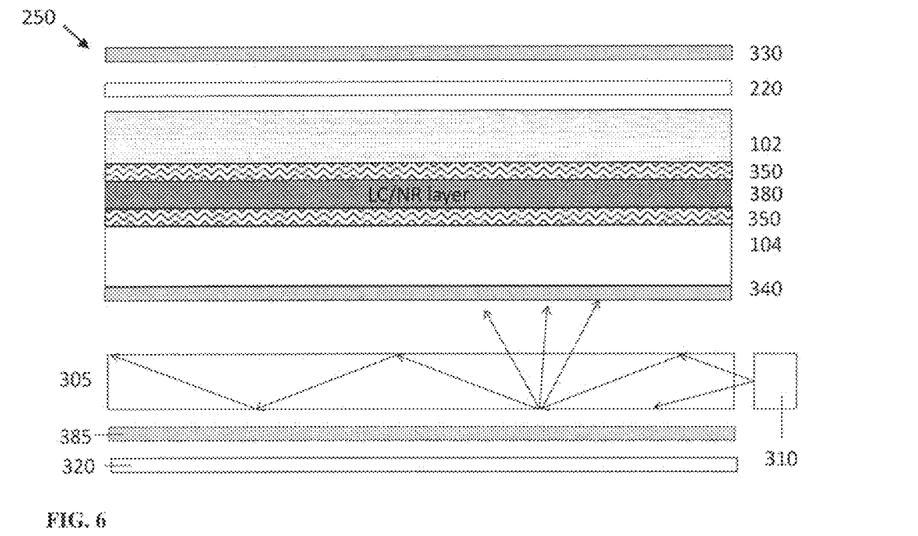
FIG. 6 illustrates the layered structure of a transparent display unit according to some embodiments of the invention.

Thus, as indicated above, the optically transparent display system/device of the invention is capable of transmitting light of a scene located behind the device while presenting an image on top of the transmitted back-scene light. In this application there is an advantage in lowering the optical absorption that occurs in the LC stack. FIG. 6 illustrates schematically a layered structure of a transparent display device 250 according to some embodiments of the invention. The display device 250 may generally include a light-guide layer 305, having low scattering and high transparency, and configured to direct light emitted by a pumping light source 310 onto the LC stack and the optically active structure/layer 380 of the device operable by electrode arrangement 350 typically including a plurality of electrode elements located in close proximity with pixel regions of the optically active structure. The LC stack may include two transparent supporting substrates 102 and 104 and the optically active LC/nanorod layer 380 located between them. Although not shown here, it should be noted that the lightguide may be replaced with a remote pumping light source as the case may be. The lightguide 305 as shown in FIG. 6 illustrates pumping light that can be provided without the need to allow open UV lamp in the region behind the display device 250. As described above, the display device 250 may include one or more color filters 220 placed on the LC stack and corresponding to the desired output color (wavelength range of emitted light) of each pixel region. The optical stack of the display device 250 as exemplified herein may include one top polarizer 330, two polarizers (top polarizer 330 and bottom polarizer 340), one bottom polarizer 340 or it may be configured with no polarizers at all. Different polarizers' configurations provide corresponding different advantages and performances for selected applications. FIG. 6 also illustrates a mechanically or electronically modulated light blocker/diffuser, or a "Smart Glass" layer, 385 located in the back side of the display device 250. Smart Glass layers 385 are generally configured to selectively transmit or block light transmission therethrough as will be described in more details further below.

In addition, the display device 250 may include one or more optional light recycling elements (not specifically shown) placed at selected locations along the optical stack. These light recycling elements may have selective wavelength transmission properties or selective polarization properties. For example a film that reflects the pumping light (e.g. UV light) may be placed in various positions below the color filters 220. Such pumping light reflector is preferably placed on the electrode side of the optically active structure 380, and is preferably configured to reflect light of the pumping wavelength range and transmit light of the emitted wavelength range (e.g. visible light). Such light recycling and reflecting elements may be configured for improving optical emission by the nanorods and/or enabling the use of lower material (amount of nanorods in the optically active structure 380) while maintaining emission intensity for a given pumping source intensity. If less material is needed in the gap between the electrodes can be smaller for the same nanorod in LC concentration thus allowing, in some configurations, the use of higher electric fields for the same voltage. This in turn may provide for greater quenching of the nanorods' emission by the applied voltage utilizing higher electric field. An additional reflective optical element 320 may be placed below the lightguide 305, the reflective optical element 320 is preferably configured with high reflectivity for the pumping wavelength and high transmission for the visible light and provide for directing more pumping light to the optically active LC/NR layer 380.

As indication above, the display device of the invention may, in some applications, benefit by not using any polarizers to obtain desired performance. In this case, in the ON state of a pixel region, the nanorods emit light and can thus produce an image on the display. Pixel regions in their OFF state will be mostly transparent and will not emit the fluorescence light. For this configuration high transmittance may be achieved and omitting the use of a polarizer may provide a gain of more than 50% in transparency and pumping light transmission, not being blocked by the bottom polarizer. This is while certain light intensity is blocked or reflected in the case where one or two polarizers are used. It may be also possible to omit the color filter layer 220 producing higher transmittance by approximately a factor of 3 (e.g. in case of white light). In this case, different pixel regions are configured to contain nanorods of different selected optical emission properties corresponding to the pixel regions' desired color of emission as described above.

For some applications there is benefit in using one or two polarizers to obtain specific performance. In some embodiments it is possible to use two polarizers 330 and 340 on the two sides of the optically active structure 380 or optical stack thereof. For example, selection of the relative directions of the polarizers, LC rubbing direction and the birefringence properties of the LC to provide various desired display properties. In some embodiments the top 330 and bottom 340 polarizers may be aligned with the same direction as the direction of the nanorod material. In such configurations the LC material may be configured to rotate the input polarized light by 90 degrees and thus causing the emitted light to be blocked by the top polarizer 330. This would block the back-scene light component (109 in FIGS. 1-4) in the ON state while providing maximal fluorescence of the nanorod material. In the OFF state the LC material is aligned vertically and thus do not rotate polarization of light passing therethrough. This is while the nanorods are also aligned vertically and substantially do not emit light. Therefore in this configuration the OFF state provides for a transparent pixel, and the ON provides pixel intensity and block back-scene light.

Figure 7:
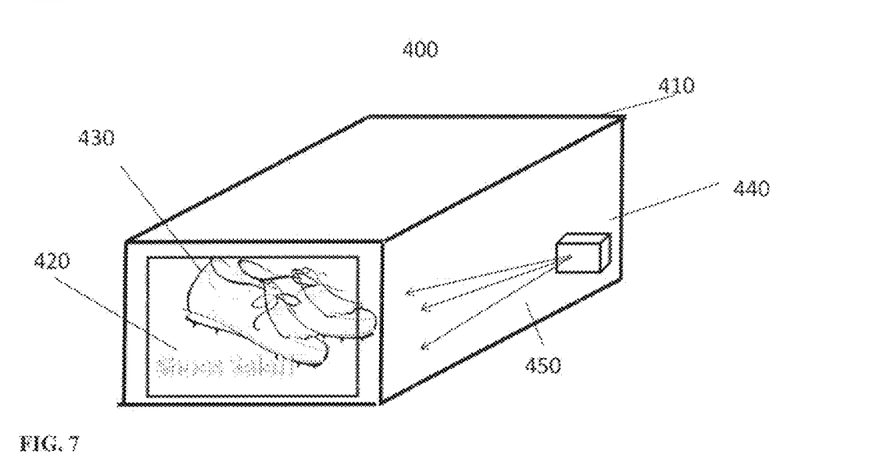
FIG. 7 exemplifies the use of a transparent display unit according to some embodiments of the invention.

Reference is made to FIG. 7 illustrating a transparent display system 400 including an enclosure (e.g. showroom box, refrigerator etc.) 410, the transparent display device of the present invention 420, an object 430 (in this case a pair of shoes) and a light source 440 configured to emit pumping light of UV or Violet rays 450 to provide pumping energy to the nanorods. Generally, the distance between the pumping light source 440 and the optically active structure of the display device 420 may be selected in accordance with display size, the dimension and constitution of the enclosure and illumination profile of pumping light source. For example, utilizing laser type pumping light source may allow increasing the distance to very large distance. Typically however, the distance between the pumping light source 440 and the display device 420 may be between a few centimeters to one or two meters (e.g. 2 cm to 200 cm) thus maintaining pumping intensity and uniform illumination. Additionally, typically the distance between the pumping light source 440 and the display device 420 may be increased for larger display area and decreased for smaller display area.

Additional lighting may be included to illuminate the object 430 (not shown here). In some embodiments the pumping light 450 or part of the pumping light may be provided by a separate transparent backlight that uses edge illumination by LED or CCFL attached to the waveguide such as shown for example in FIG. 6. In another embodiment (not shown) the pumping light can be directed at the display from the viewer's side of the display device.

In some embodiments the UV pumping light may be polarized and directed to the display device in a preferred desired polarization direction. If the UV polarization direction coincides with the ON state nanorods' long axis direction, the nanorods provide increased light absorbance as compared with the OFF state that is not sensitive to the input polarization direction. This can further increase the contrast ratio obtained by a factor of two. The display device may also include an additional filter, e.g. wavelength selective filter, being located in optical path of light emitted by the display device and propagating towards viewers. The additional filter may be use to block and/or diffuse passage of light of the pumping wavelength range, e.g. UV (UVA) or violet light while transmitting light of visible wavelength range such as background and/or emitted light. The additional filter may be configured for absorbing the light that is not absorbed in the display itself. Since the pumping light has no or very little visibility it is possible to increase the pumping so the display can provide a luminescent image. This allows separating the illumination of the object with visible light from that of the display that uses the pumping light. This provides an advantage over regular transparent displays where the same visible light is used to enable the display and to illuminate the object and its surrounding.

As the amount of light necessary for the display to output may be changed in accordance with the surrounding ambient light level, the display device of the invention may include a photo sensor in the vicinity of the display on the viewer's side and possibly also a photo sensor on the object side of the display. These sensors are configured to detect light intensity in their surrounding and transmit the light levels to a controller module configured to modulate intensity of the pumping light and the visible light that illuminates the object to provide optimal lighting conditions for the display. For example, in daylight the intensity of pumping light should be increased to match the high intensity ambient light surrounding the viewers. This is while in nighttime (relative darkness) the pumping light should be decreased to adjust the brightness of the screen to that of the surrounding. In this example the visible light directed at the object may be increased (decreased) as well in daylight (dark).

In some embodiments the transparent display device according to the present invention may be used together with one or more selective light filtering elements, allowing the display device to operate either in its transparent or non-transparent modes. More specifically, the selective light filtering element(s) may be used to convert the display device to a fluorescence non-transparent display, i.e. having a "regular-mode" function thus providing display of the image generated by different pixel regions while preventing light from behind the device to reach the viewers. The selective light filtering element may be a light blocking/diffusing layer, located between the back-light input of the transparent display device and the objects/scene located behind the display as is shown in FIG. 6 (element 385). The blocking/diffusing layer may block or at least strongly diffuse light coming from any object and/or from the entire scene located behind the display device.

The use of a blocking/diffusing component allows the fluorescent light emitted by the nanorods to form an image on the display, while avoiding transmission of back-scene light through the display. Additional mechanical screens or shutters may be used, positioned either manually or by electronic control to provide the desired blocking and/or diffusing of back-scene light. Preferably the blocking/diffusing element is configured to reflect the pumping light into the display to thereby provide pumping energy to the nanorods of the display device.

Alternatively or additionally, one or more electronically controlled transparent media may be used as selective light filter(s), such selective transmitting layer is exemplified in FIG. 6 (element 385). The electronically controlled transparent media may be either transparent or opaque/diffusive with regard to light transmission therethrough. Such electronically controlled filters are generally known as "Smart Windows".

"Smart Glass" display devices may generally be configured to selectively allow or block transmission of back-scene light through the device, while simultaneously and independently allow the display device of the present invention to display desired images on at least one surface of the device. Switching between a highly transparent and a light blocking or light diffusing states, as well as variation of the displayed images may be provided by a dedicated control unit connected to the electrode arrangement as described above as well as to the blocking/diffusing element and also possibly to the pump and object light sources. "Smart Glass" devices may use various physical and chemistry phenomena utilizing technologies of devices such as: Electrophoretic devices, Electro-wetting devices, Suspended Particle Devices (SPDs), Electrochromic devices, Polymer dispersed liquid crystal devices and Micro-blinds.

Additional technologies not listed above may be used to provide similar function. The "Smart Glass" elements can provide an opaque and or diffusive layer by electrical control of voltage, thus allowing the conversion of the transparent display into a regular display or a light blocking screen with a simple electrical control. The "Smart Glass" may also be configured also reflect the pumping light back to the NR-LC layer to increase the light emission output.

Thus the present invention provides a display device utilizing an optically active layer. The active layer includes LC material and light emitting nanorods to provide desirably modulated illumination in response to pumping light. The device may be configured to provide a transparent display capable of providing color image on top of transmission of background light of objects located behind the device. Those skilled in the art will readily appreciate that various modifications and changes can be applied to the embodiments of the invention as hereinbefore described without departing from its scope defined in and by the appended claims.

The invention claimed is:

1. A display device comprising an optically active structure configured to generate patterned illumination generating desired image, the optically active structure comprising at least one layer comprising optically active nanorods configured to emit output light of a predetermine wavelength range in response to pumping energy, and liquid crystal material, said device having a viewer's side and an object side, said display device further comprising a photo sensor on the viewer's side configured to detect surrounding light intensity for use in modulating intensity of the pumping energy, wherein said optically active structure is (a) in the OFF state when no electric field is applied and in the ON state when an electrical field is applied, or (b) is in the ON state when no electric field applied and in the OFF state when an electrical field is applied, wherein in the OFF state the nanorods are oriented such that the long axis thereof is perpendicular to the surface of the layer, wherein the display device further comprises one or more electronically controlled transparent media as selective light filter(s) configured to selectively allow or block transmission of background light of objects through the device, and wherein said display device is configured to provide a transparent display capable of providing color image on top of transmission of background light of objects located behind the device.

2. The display device of claim 1, wherein the display device is at least partially transparent to visible light.

3. The display device of claim 1, wherein said at least one layer comprises a mixture of said optically active nanorods and said liquid crystal material such that variation in orientation of the liquid crystal material causes corresponding variation in orientation of said optically active nanorods.

4. The display device of claim 1, wherein said optically active nanorods are configured to be responsive to pumping energy being optical pumping of a first predetermined wavelength range, to thereby emit light of one or more second wavelength ranges.

5. The display device of claim 4, wherein said first wavelength range comprises at least one of the following: violet light and ultra violet light wavelengths and wherein said one or more second wavelength ranges comprise visible light.

6. The display device of claim 1, wherein said optically active structure comprises an electrode arrangement configured to selectively apply electric field onto said liquid crystal material to thereby cause variation in orientation thereof.

7. The display device of claim 6, wherein said electrode arrangement comprises plurality of electrode elements defining a plurality of separately operated pixel regions of said optically active structure.

8. The display device of claim 1, wherein said optically active nanorods comprise nanorods of two or more types, each nanorods' type is selected in accordance with dimension and structure and composition of the nanorods to emit light of predetermined different wavelength range.

9. The display device of claim 8, wherein said nanorods of two or more types comprise at least three types of nanorods, each type is selected to emit light of a predetermined wavelength range corresponding with a primary color.

10. The display device of claim 1, wherein the display device comprises a pumping light source configured to provide pumping energy in the form of optical pumping of a first wavelength range to thereby cause said optically active nanorods to emit light of one or more second wavelength ranges.

11. The display device of claim 10, wherein said pumping light source being configured to be located at a predetermined distance from said optically active structure, said predetermined distance being higher than 1 centimeter.

12. The display device of claim 1, further comprising at least one filter layer configured to filter out light of undesired wavelength ranges.

13. The display device of claim 12, wherein said filter layer is configured to block transmission of ultra violet illumination and allow transmission of light of the visible spectrum.

14. The display device of claim 1, wherein said liquid crystal material and said optically active nanorods of the optically active structure are mixed together such that variation in orientation of said liquid crystal material in certain region of the structure caused variation of rotation of said optically active in said region, thereby increasing or reducing optical emission from said nanorods in response to pumping energy.

15. The display device of claim 1, wherein in the ON state the nanorods are aligned with long axis thereof being parallel to a surface of said at least one layer and emit light in response to pumping energy.

16. The display device of claim 15, wherein the optically active structure is further configured for providing one or more intermediate states associated with orientation of the liquid crystal material thereby enabling one or more intermediate levels of optical emission from one or more pixel regions.

17. A display device comprising:
a pumping light source configured to provide optical illumination of a first pumping wavelength range;
an optically active structure comprising at least one layer comprising liquid crystal material and a plurality of optically active nanorods mixed together within said at least one layer, wherein in one orientation of the liquid crystal material, the nanorods respond to input radiation of a first pumping wavelength range by emitting light of one or more predetermined second wavelength ranges at a first intensity level and in another orientation of the liquid crystal material the emission from the nanorods is reduced to a second intensity level, and
an electrode arrangement configured to selectively apply an electrical field to desired pixel regions of the optically active structure to thereby modulate light emission of nanorods in desired pixel regions of the display device,
said device having a viewer's side and an object side,
said display device further comprising a photo sensor on the viewer's side configured to detect surrounding light intensity for use in modulating intensity of the pumping energy,
wherein said optically active structure is (a) in the OFF state when no electric field is applied and in the ON state when an electrical field is applied, or (b) is in the ON state when no electric field applied and in the OFF state when an electrical field is applied,
wherein in the OFF state the nanorods are oriented such that the long axis thereof is perpendicular to the surface of the layer,
wherein the display device further comprises one or more electronically controlled transparent media as selective light filter(s) configured to selectively allow or block transmission of background light of objects through the device, and
wherein said display device is configured to provide a transparent display capable of providing color image on top of transmission of background light of objects located behind the device.

18. The display device of claim 17, wherein the optically active nanorods are configured as having material composition and geometry to emit light of said at least one second wavelength range.

19. The display device of claim 17, wherein the liquid crystal material is configured to vary orientation thereof in response to external electric field, and wherein variation in orientation of the liquid crystal material causes said optically active nanorods rotation accordingly, thereby varying emission of light by the nanorods.

20. The display device of claim 19, wherein said variation in orientation of the liquid crystal material provides for a continuous variation of emission of light from the nanorods.

21. The display device of claim 19, wherein the liquid crystal material and the optically active nanorods are aligned along a predetermined axis parallel to surface of the structure in one orientation state and vary orientation thereof to be aligned along a predetermined axis perpendicular to the surface of the structure in another orientation state.

22. The display device of claim 17, wherein the liquid crystal material has a negative dielectric anisotropy.

23. The display device of claim 17, further comprising an electrode arrangement comprising a plurality of electrode elements defining a plurality of separately operable pixels of the structure, said electrode elements of the electrode arrangement are configured to selectively apply electric field to corresponding pixels to thereby cause rotation of the liquid crystal material and optically active nanorods.

24. The display device of claim 17, comprising optically active nanorods of two or more type, wherein each type comprises optically active nanorods having material composition and dimensions selected to provide optical emission in selected wavelength range different from wavelength range of nanorods of other types.

25. The display device of claim 24, wherein optically active nanorods of different type are being arrange is a plurality of pixel regions of the structure thereby enabling color image formation by selective spatial and temporal variation of emitted light.

26. The display device of claim 17, wherein said optically active structure, liquid crystal and optically active nanorods thereof are configured to be optically partially transparent to light of the visible spectrum, said optically active nanorods being configured to emit light of visible spectrum in response to pumping light in a first wavelength range comprising ultra-violet (UV) or violet illumination.

27. The display device of claim 17, wherein the liquid crystal material comprises nematic liquid crystals material.

28. The display device of claim 17, further comprising at least one alignment layer located in physical contact with said liquid crystal material, said at least one alignment layer is configured to align the liquid crystal material in rest state thereof.

29. The display device of claim 28, wherein said at least one alignment layer comprising polymer stabilized vertical alignment layer.

30. The display device of claim 17, further comprising one or more domain separators located is physical contact with the liquid crystal material and nanorods material at one or two sides of the structure to thereby provide multi-domain alignment of the liquid crystal material and the corresponding nanorods.

31. The display device of claim 17, configured for use in a display device.

32. The display device according to claim 17, further comprising a photo sensor on the object side of the display device.

33. A display device according to claim 17, wherein the display device is at least partially transparent to light of the visible wavelength range.

34. A display device according to claim 17, further comprising a blocking/diffusing layer located between the device and light arriving from back-scene thereof, the blocking/diffusing element is configured to selectively block or diffuse light of a predetermined wavelength range arriving from back-scene of the device.

35. The display device of claim 1, wherein said optically active nanorods are selected from rod-shaped semiconductor nanoparticles.

36. The display device of claim 1, wherein said optically active nanorods have a core-shell structure, core-double shell structure or core-multi-shell structure, wherein the core is formed of a first material composition and the one or more shells are formed of one or more other material compositions.

37. The display device of claim 1, wherein said optically active nanorods are made from semiconductor material(s) selected from CdS, CdSe, CdTe, ZnS, ZnSe, ZnTe, ZnO, GaAs, GaP, GaAs, GaSb, HgS, HgSe, HgTe, InAs, InP, InSb, AlAs, AlP, AlSb, $Cu_2S$, $Cu_2Se$, $CuInS_2$, $CuInSe_2$, $Cu_2(ZnSn)S_4$, $Cu_2(InGa)S_4$, $TiO_2$ alloys thereof, and mixtures thereof.

38. The display device of claim 1, wherein the liquid crystal material has a negative dielectric anisotropy.

39. The display device of claim 1, wherein said optically active structure is in the OFF state when no electric field is applied.

40. The display device of claim 17, wherein said optically active structure is in the OFF state when no electric field is applied.

41. A display device comprising:
an optically active structure configured to generate patterned illumination generating a desired image,
the optically active structure comprising at least one layer comprising optically active nanorods and liquid crystal material,
said optically active nanorods comprise fluorescence anisotropic nanomaterial and are capable of absorbing light at a first wavelength range from 320-450 nm, and in response emitting by fluorescence light of one or more second wavelength ranges within the visible spectrum, said nanorods having a long axis and a short axis wherein the ratio between the length along the long axis and the length along the short axes is higher than 1.5,
wherein said display exhibits an ON state and an OFF state in which in the OFF state the nanorods are oriented such that the long axis thereof is perpendicular to the surface of said at least one layer, and in the ON state at least some of the nanorods are aligned such that the long axis thereof is parallel to the surface of said at least one layer or at an angle of ±10 degrees with respect to the surface of said at least one layer and said fluorescence light of one or more second wavelength ranges is transmitted through the surface of said at least one layer, and
wherein
(a) said optically active structure is in the OFF state when no electric field is applied and can be changed to the ON state by application of an electrical filed, or
(b) said optically active structure is in the ON state when no electric field is applied and can be changed to the OFF state by application of an electrical filed.

* * * * *